(12) United States Patent  
Chou

(10) Patent No.: US 11,455,179 B1  
(45) Date of Patent: Sep. 27, 2022

(54) PROCESSING SYSTEM AND PROCESSING METHOD FOR PERFORMING EMPHASIS PROCESS ON BUTTON OBJECT OF USER INTERFACE

(71) Applicant: REALTEK SEMICONDUCTOR CORP., Hsinchu (TW)

(72) Inventor: Kai-Hsiang Chou, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/475,441

(22) Filed: Sep. 15, 2021

(30) Foreign Application Priority Data

Mar. 8, 2021 (TW) ................................ 110108096

(51) Int. Cl.
| | | |
|---|---|---|
| *G06K 9/62* | (2022.01) | |
| *G06F 3/0481* | (2022.01) | |
| *G06N 20/00* | (2019.01) | |
| *G06V 30/10* | (2022.01) | |
| *G06F 9/451* | (2018.01) | |
| *G06V 10/28* | (2022.01) | |

(52) U.S. Cl.  
CPC ............ *G06F 9/451* (2018.02); *G06F 3/0481* (2013.01); *G06K 9/6215* (2013.01); *G06K 9/6256* (2013.01); *G06K 9/6267* (2013.01); *G06N 20/00* (2019.01); *G06V 10/28* (2022.01); *G06V 30/10* (2022.01)

(58) Field of Classification Search  
None  
See application file for complete search history.

(56) References Cited

U.S. PATENT DOCUMENTS

| | | | |
|---|---|---|---|
| 7,191,407 B1* | 3/2007 | Kluttz | G06F 9/451 |
| | | | 715/788 |
| 10,643,107 B1* | 5/2020 | Yoo | G06V 10/454 |
| 10,970,577 B1* | 4/2021 | Song | G06N 3/0454 |
| 11,257,198 B1* | 2/2022 | Holub | G06V 10/82 |
| 2009/0128548 A1* | 5/2009 | Gloudemans | G06V 10/273 |
| | | | 382/103 |
| 2019/0087691 A1* | 3/2019 | Jelveh | G06N 3/084 |
| 2021/0217129 A1* | 7/2021 | Deshmukh | G06T 1/005 |
| 2021/0264141 A1* | 8/2021 | Chojnacki | G06T 7/292 |
| 2021/0272264 A1* | 9/2021 | Frei | G06T 7/70 |

* cited by examiner

*Primary Examiner* — Henry Orr  
(74) *Attorney, Agent, or Firm* — Li & Cai Intellectual Property (USA) Office

(57) ABSTRACT

A processing system and a processing method for a user interface are provided. The processing method includes a learning phase and an application phase. After a specific model is established in the learning phase, the user interface with specific meanings such as closing and rejection can be automatically found in the application phase for performing an emphasis process.

20 Claims, 7 Drawing Sheets

PROCESSING SYSTEM AND PROCESSING METHOD FOR PERFORMING EMPHASIS PROCESS ON BUTTON OBJECT OF USER INTERFACE

CROSS-REFERENCE TO RELATED PATENT APPLICATION

This application claims the benefit of priority to Taiwan Patent Application No. 110108096, filed on Mar. 8, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a processing system and a processing method, and more particularly to a processing system and a processing method for a user interface.

BACKGROUND OF THE DISCLOSURE

With popularization of personal computers and rapid development of the Internet, modern people have become very accustomed to using personal computers to handle various tasks, and browsing a variety of information on the Internet through the browser in the personal computer. Based on commercial considerations, webpages provided by most commercial websites currently contain many advertisements for various products or services related to the content of the webpages or related to other businesses. Whenever users link to these webpages or at specific timings, advertisements may pop up and appear in front of the users, thereby achieving an effect of advertising and marketing.

However, whether it is a mobile phone screen or a browser screen, the screens are now easily filled with advertisements. In some cases, cover ads even take up the entire screen leaving almost no content for users to see, and only ads and pop-up windows are left.

However, in the above-mentioned situations, whether the screen is operated with a mouse, a touch, or even a remote control, there is a high probability of pressing incorrectly and then being directed to an undesirable display image, which is a waste of time and energy for the users.

SUMMARY OF THE DISCLOSURE

In response to the above-referenced technical inadequacies, the present disclosure provides a processing system and processing method for a user interface, which can automatically find and emphasize closing options.

In one aspect, the present disclosure provides a processing method for a user interface, including: configuring a processor to enter a learning phase, including: configuring the processor to capture a first screen of the user interface; configuring the processor to detect whether there is a user input from an input module, and the user input corresponds to an input position on the user interface; in response to detecting the user input, configuring the processor to capture a second screen of the user interface; configuring the processor to compare a difference between the first screen and the second screen and store the difference in a memory; configuring the processor to execute a first identification process to detect a closed frame as a button object from the difference according to the input position; configuring the processor to execute a second identification process to identify a characteristic object from the button object; and configuring the processor to associate the button object with the characteristic object and store the button object and the characteristic object in the memory; and configure the processor to enter an application phase, including: configuring the processor to capture a current screen of the user interface, and use the first identification process to detect whether the button object exists in the current screen; in response to detecting that the button object exists in the current screen, configuring the processor to execute the second identification program to determine whether the button object has the characteristic object; and in response to determining the button object has the characteristic object, configuring the processor to perform an emphasis process on the button object in the current screen of the user interface.

In another aspect, the present disclosure provides a processing system including a user interface, an input module, a memory, and a processor. The processor is configured to enter a learning phase and an application phase. In the learning phase, the processor is configured to: capture a first screen of the user interface; detect whether there is a user input from an input module, and the user input corresponds to an input position on the user interface; in response to detecting the user input, capture a second screen of the user interface; compare a difference between the first screen and the second screen and store the difference in the memory; execute a first identification process to detect a closed frame as a button object from the difference according to the input position; execute a second identification process to identify a characteristic object from the button object; and associate the button object with the characteristic object and store the button object and the characteristic object in the memory. In the application phase, the processor is configured to: capture a current screen of the user interface, and use the first identification process to detect whether the button object exists in the current screen; in response to detecting that the button object exists in the current screen, execute the second identification process to determine whether the button object has the characteristic object; and in response to determining the button object has the characteristic object, perform an emphasis process on the button object in the current screen of the user interface.

Therefore, the processing system and processing method for the user interface provided by the present disclosure can automatically find user interfaces representing specific meanings, such as closing and rejecting after a specific model is established through the learning phase, so as to perform the emphasis process to increase a sensing range or dynamically zoom, color, flash, and the like to prompt the user to close unnecessary advertisements or windows at the position that the emphasis process is performed, thereby reducing the chance of users touching the screen by mistake and wasting users' time and energy.

In addition, for different types of buttons, such as a button object with a text object or a graphic object, the processing system and processing method for the user interface provided by the present disclosure can perform targeted learning for characteristics of the above objects, and can even learn about non-button type objects, which enhances freedom in system learning for the users.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
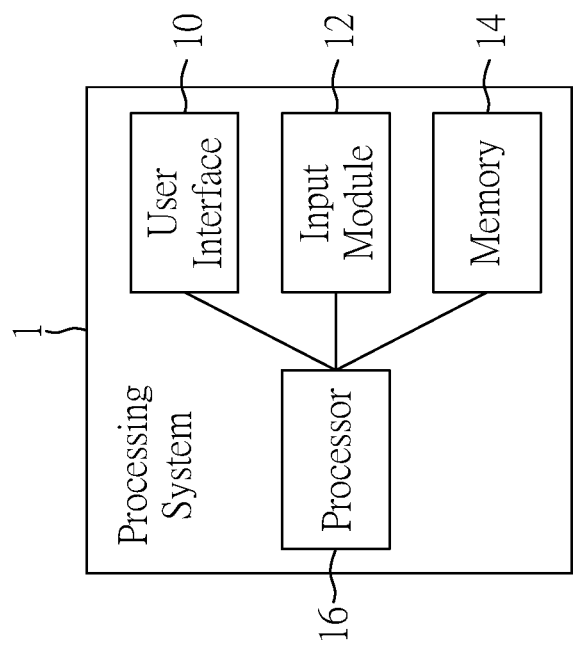
FIG. 1 is a functional block diagram of a processing system for a user interface according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a processing system for a user interface according to an embodiment of the present disclosure. Referring to FIG. 1, an embodiment of the present disclosure provides a processing system 1, which includes a user interface 10, an input module 12, a memory 14, and a processor 16.

The processing system 1 is, for example, a desktop computer, a notebook computer, a smart phone, a tablet computer, a game console, an e-book, or a smart TV, and the like, and the present disclosure is not limited thereto.

The user interface 10 can be, for example, a liquid crystal display (LCD), a light-emitting diode (LED) display, a field emission display (FED), or an organic light-emitting diode, OLED) or other types of displays, and the present disclosure is not limited thereto. In other embodiments, the user interface 10 can be, for example, a browser executed by the processor 16 in an operating system.

The input module 12 is used to receive user operations issued by the user, such as a mouse, a keyboard, a touch device, or a remote controller.

The memory 14 is used to store data such as images, program codes, software modules, and the like, and the memory 14 can be, for example, any type of fixed or removable random access memory (RAM), read-only memory (ROM), flash memory, hard disk or other similar devices, integrated circuits, and combinations thereof.

The processor 16 is, for example, a central processing unit (CPU), or other programmable general-purpose or special-purpose microprocessor, digital signal processor (DSP), programmable controllers, application specific integrated circuits (ASIC), programmable logic device (PLD), graphics processing unit (GPU) or other similar devices, or a combination of these devices. The processor 16 can execute program codes, software modules, commands, and the like recorded in the memory 14 to implement the processing method of an embodiment of the present disclosure.

Figure 2:
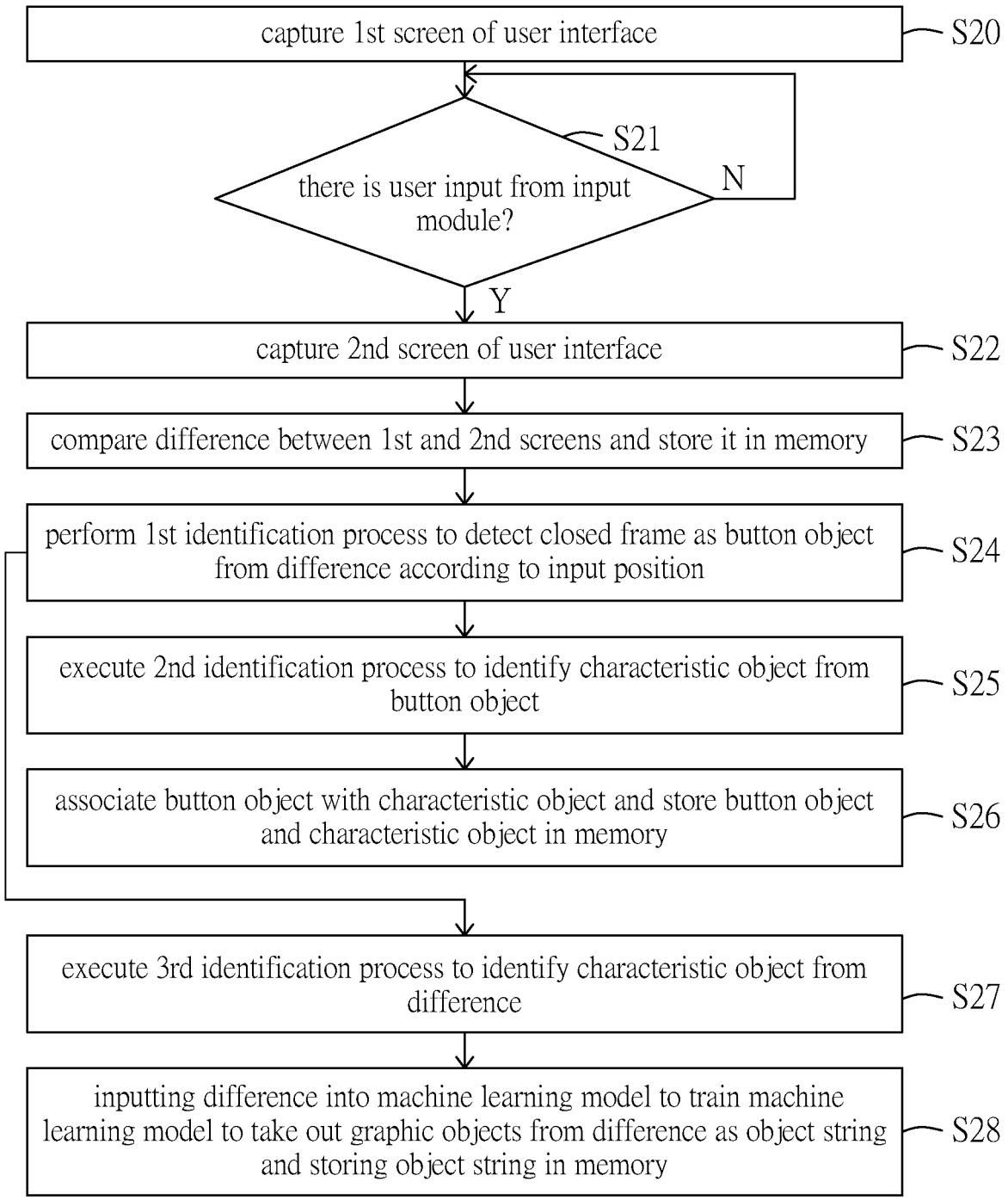
FIG. 2 is a first flowchart of a processing method for the user interface according to an embodiment of the present disclosure.
Figure 3:
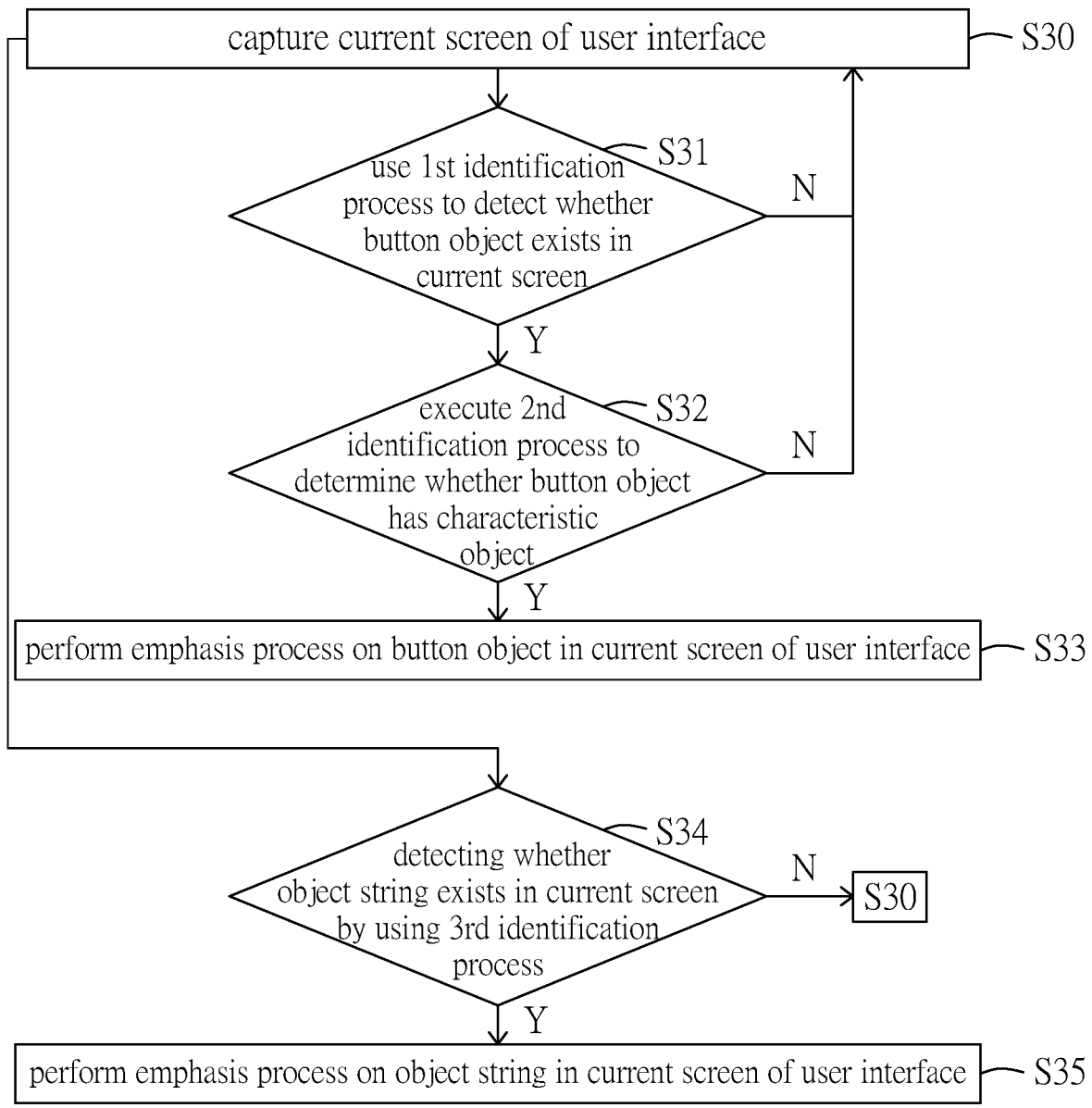
FIG. 3 is a second flowchart of a processing method for the user interface according to an embodiment of the present disclosure.

FIGS. 2 and 3 are first and second flowcharts of a processing method for a user interface according to an embodiment of the present disclosure. Reference is made to FIGS. 2 and 3, the processing method of the present embodiment is applicable to the processing system 1 in the above-mentioned embodiment, and detailed steps of the processing method for the user interface of this embodiment are described with various components in the processing system 1.

Figure 4B:
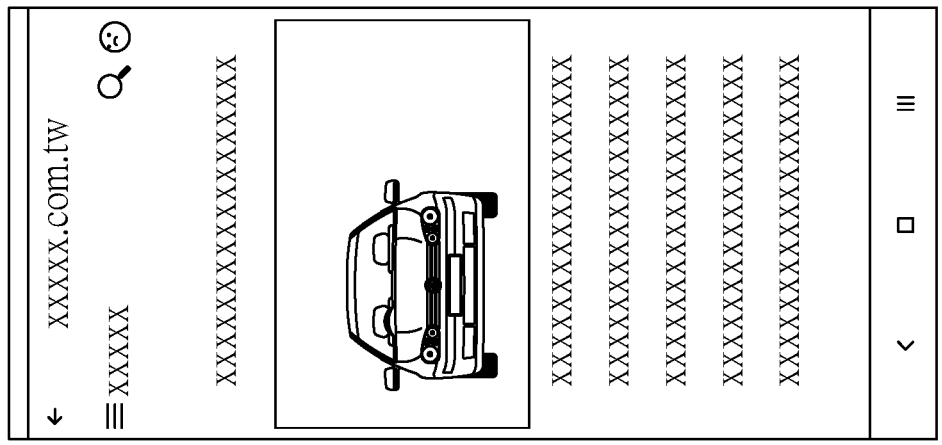
FIG. 4B is a schematic diagram of a second screen of the user interface according to an embodiment of the present disclosure.
Figure 4A:
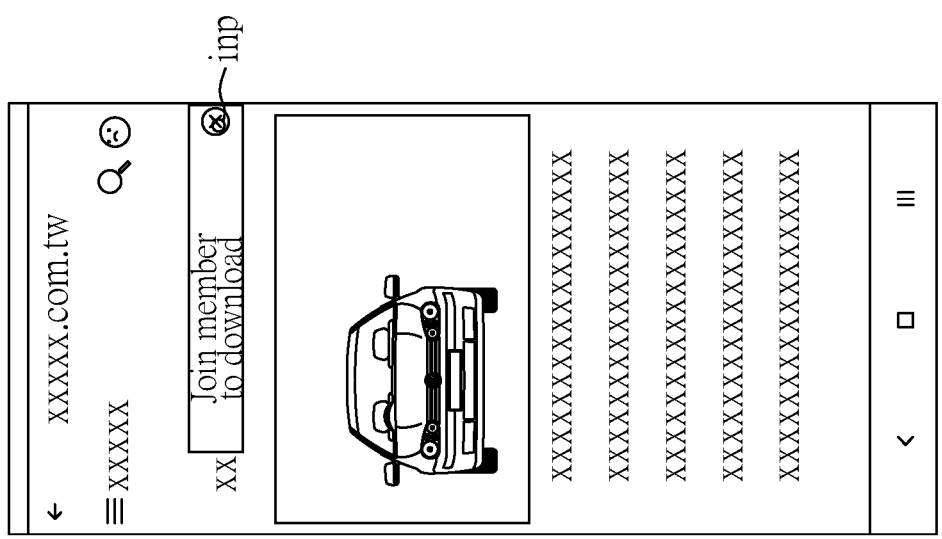
FIG. 4A is a schematic diagram of a first screen of the user interface according to an embodiment of the present disclosure.

The processing method includes a learning phase and an application phase. As shown in FIG. 2, the learning phase can include configuring the processor 16 to perform the following steps:

Step S20: capture a first screen of the user interface 10. For example, reference can be made to FIG. 4A, which is a schematic diagram of a first screen of a user interface according to an embodiment of the present disclosure. FIG. 4A shows a browser screen of a mobile device, and a banner advertisement area with a closing option in FIG. 4A indicating the user to join as a member.

Step S21: detect whether there is a user input inp from the input module 12. As shown in FIG. 4A, the user input inp corresponds to an input position on the user interface 10. For example, the user input inp can be obtained by scanning a key input, and can include a touch input or a remote control input, in which a corresponding key code value and a corresponding input position corresponding to the user input, for example, coordinates on the user interface 10, can be recorded.

In response to detecting the user input inp in step S21, the method proceeds to step S22: capture a second screen of the user interface 10. Reference can be made to FIG. 4B, which is a schematic diagram of a second screen of a user interface according to an embodiment of the present disclosure. FIG. 4B also shows the browser screen of the mobile device. After the user clicks the closing option in FIG. 4A, the banner advertisement area disappears.

In response to the user input inp not being detected in step S21, step S21 is repeatedly executed until the user input inp is detected, and the processing method proceeds to step S22.

In detail, steps S20 to S22 are mainly used to record changes of the screen after the user input inp is detected. For example, when an advertisement block and an accompanying closing option appear on a web page, when the user operates the closing option through the input module 12, the user input inp and the changes of the screen are recorded. Optionally, the user can be asked through the user interface 10 whether to automatically record the association, or can automatically check the agree button to record the association.

Step S23: compare a difference between the first screen and the second screen, and store the difference in the memory 14. For example, the disappeared advertising banner area (including a part of the closing option) can be regarded as the difference to be stored.

Step S24: perform the first identification process to detect a closed frame as a button object from the difference according to the input position. The first identification process can be, for example, an image processing method, which will be illustrated hereinafter.

Figure 5:
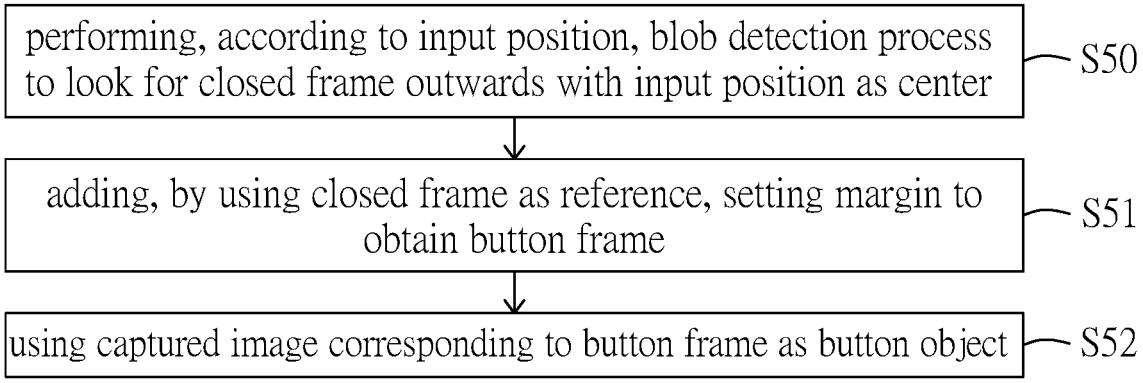
FIG. 5 is a flowchart of a first identification process according to an embodiment of the present disclosure.

Reference can be made to FIG. 5, which is a flowchart of a first identification process according to an embodiment of the present disclosure. As shown in FIG. 5, in some embodiments, the first identification process can include:

Step S50: performing, according to the input position, a blob detection process to look for a closed frame outwards with the input position as the center. In the field of visualization, the main concept of the blob detection is to detect an area from an image that has larger or smaller gray values than gray values of surrounding pixels, but the present disclosure is not limited to this image processing method.

Step S51: adding, by using the closed frame as a reference, a setting margin to obtain a button frame. For example, taking the closing option of FIG. 4A as an example, in this step, a circle around the option is regarded as a closed frame, and a user-set or preset distance is used as the setting margin to extend outward to generate the button frame.

Step S52: using a captured image corresponding to the button frame as the button object. For example, the first screen of FIG. 4A is captured with the obtained button frame, and a captured part of the image is used as the button object.

Reference is made to FIG. 2 again. The processing method proceeds to step S25: execute a second identification process to identify a characteristic object from the button object. In detail, this step can adopt different identification manners according to the content of the button object. For example, for the button object including text, a text identification can be used, and for the button object including an image, an image identification can be used.

Figure 6:
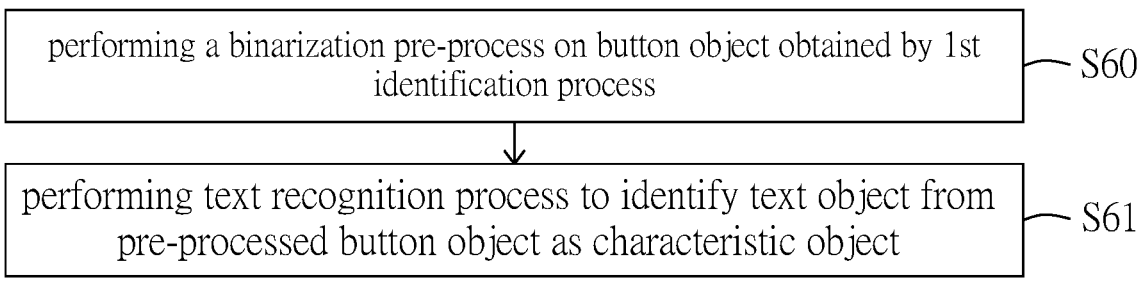
FIG. 6 is a first flowchart of a second identification process according to an embodiment of the present disclosure.

In more detail, reference can be made to FIG. 6, which is a first flowchart of a second recognition process according to an embodiment of the present disclosure. As shown in FIG. 6, the second identification process includes:

Step S60: performing a binarization pre-process on the button object obtained by the first identification process. In detail, considering that the text in the button object may be highlighted, framed, or presented in other colors. Therefore, the binarization pre-process needs to be performed on the button object, which is then identified. However, in general, the text in the button object is usually provided to be easy for users to read without deliberately adding a robot blocking mechanism. Therefore, this step does not require a more complicated image pre-processing method, but the present disclosure is not limited thereto.

Step S61: performing a text recognition process to identify a text object from the pre-processed button object as the characteristic object. In this step, the text identification process can be, for example, an optical character recognition (OCR) manner. In addition to identifying individual characters, the character identification process can also include a single character correction mechanism or a short text correction mechanism.

Figure 7:
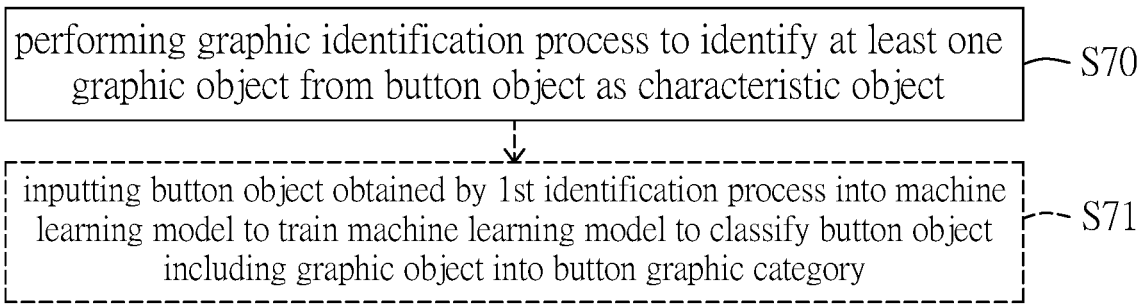
FIG. 7 is a second flowchart of the second identification process according to an embodiment of the present disclosure.

In addition, reference can be made to FIG. 7, which is a second flowchart of a second identification process according to an embodiment of the present disclosure. As shown in FIG. 7, the second identification process includes:

Step S70: performing a graphic identification process to identify at least one graphic object from the button object as the characteristic object.

In some embodiments, the image identification process can involve identifying image features through machine learning models. For example, the graphic identification process can include step S71: inputting the button object obtained by the first identification process into a machine learning model to train the machine learning model to classify the button object including the graphic object into a button graphic category.

For example, a machine learning model (for example, YOLO V3 model) can be used to identify graphic objects in the button object. In other embodiments, the machine learning model can be a CNN model in deep learning, a model using an NMS algorithm, or other machine learning models that can be used for object detection, but the present disclosure is not limited thereto.

In more detail, the machine learning model used to identify graphic objects can be trained by many button objects including graphic objects. During a training process of the machine learning model, a large number of images of button objects can be collected, and the large number of images of button objects can be input to train the machine learning model to gradually form a set of rules that can be used to predict graphic objects (that is, parameters of the machine learning model), so as to finally establish a machine learning model that can be used to detect graphic objects.

Reference is made to FIG. 2 again. The learning phase proceeds to step S26: associate the button object with the characteristic object and store the button object and the characteristic object in the memory 14 for use in the subsequent application phase.

In addition, in response to the closed frame not being detected from the difference in step S23, the learning phase proceeds to step S27: configuring the processor to execute a third identification process to identify a characteristic object from the difference.

In the embodiment of the present disclosure, the third identification process includes performing a graphic identification process (for example, the aforementioned YOLO V3 model). In general, the characteristic object includes a plurality of graphic objects. The graphic identification process can execute step S28 for example: inputting the difference into a machine learning model to train the machine learning model to take out the plurality of graphic objects from the difference as an object string and storing the object string in the memory.

In detail, when the closed frame cannot be detected, the difference can also be directly taken out as a learning object. For example, an entire screenshot can be reduced to a fixed size, such as 400×400, and the entire screenshot can be input to train the machine learning model, such that when the closed frame cannot be detected in the subsequent application phase, the current screen can be directly compared with the entire screenshot used to train the machine learning model.

On the other hand, if an amount of calculation and storage space are taken into consideration, when using the machine learning model, a characteristic detection can be further performed on the difference, and the detected characteristic objects, such as houses, cars, and people (in certain embodiments, buttons can be included) are recorded as an object string. For example, each object is stored as a video object in MPEG-4 standard to form the object string. After the above learning phase, the processing method can enter the application phase. It should be noted that the above-mentioned learning phase means on-line learning, and mainly refers to users who use their own devices or platforms to learn and establish a database by themselves. In contrast, in other embodiments, off-line learning can also be used, which means that users can directly use a learned database in the cloud through the network without re-learning, and the present disclosure is not limited thereto.

In addition, reference can be further made to FIG. 3, the application phase includes configuring the processor 16 to perform the following steps:

Step S30: capture a current screen of the user interface.

Step S31: use the first identification process to detect whether the button object exists in the current screen. Similarly, steps S50 to S52 can be performed to determine whether the button object exists, which will not be repeated herein. It should be noted that this step can first determine whether there is a button frame in the current screen, and then compare the detected button frame with the button frame learned in the learning phase to determine whether the button object exists.

In response to detecting that the button object exists in the current screen, the application phase proceeds to step S32: execute the second identification process to determine whether the button object has the characteristic object. As mentioned above, different identification methods can be used according to the content of the button object. In other words, the application phase is performed based on the same principle.

Figure 8:
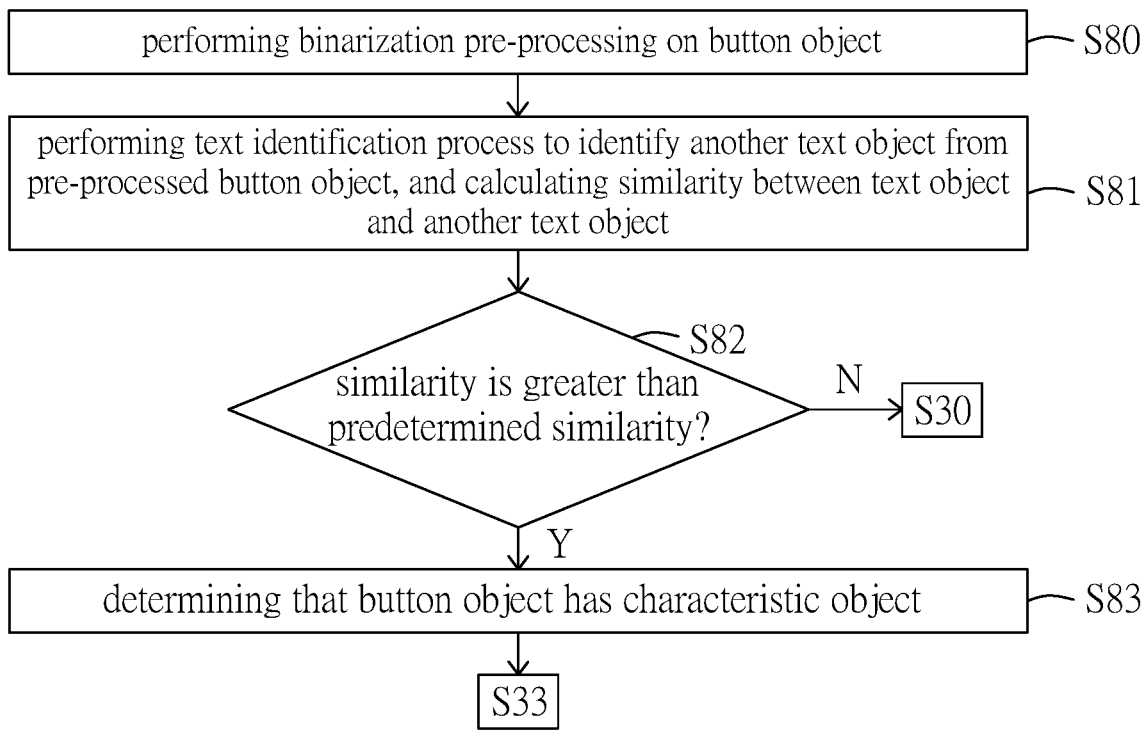
FIG. 8 is another flowchart of an application phase according to an embodiment of the present disclosure.

Therefore, further reference can be made to FIG. 8, which is another flowchart of the application phase according to an embodiment of the present disclosure. In the application phase, the step of determining whether the button object has the characteristic object further includes:

Step S80: performing binarization pre-processing on the button object.

Step S81: performing the text identification process to identify another text object from the pre-processed button object, and calculating a similarity between the text object and the another text object.

For example, a probability percentage (for example, confidence score) that the text object identified in step S81 is similar to the text object in the memory 14 can be calculated, or an error distance between the two can be calculated. The higher the confidence score or the lower the error distance, the higher the similarity. In addition, the comparison can be a word-by-word comparison or a word-by-string comparison, which is not described in detail here in the present disclosure.

Step S82: determining whether the similarity is greater than a predetermined similarity. The predetermined similarity can be set by the user, and when the similarity is higher than a certain level, it is determined that the text object identified in step S81 is the same as the text object in the memory 14.

In response to the similarity being greater than the predetermined similarity, the application phase proceeds to step S83: determining that the button object has the characteristic object.

Figure 9:
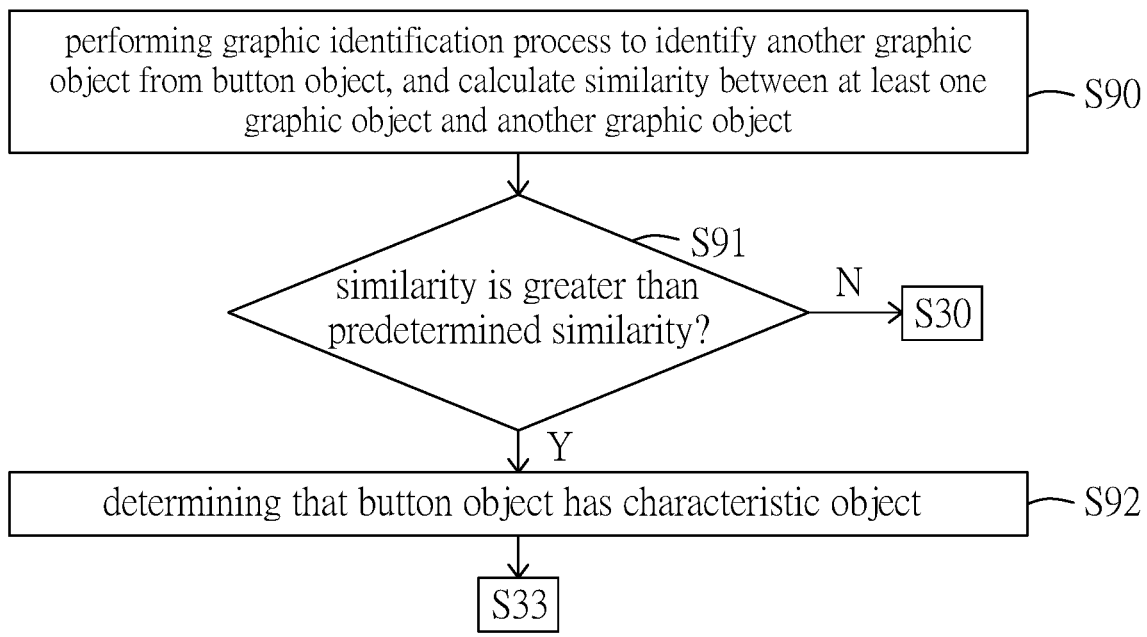
FIG. 9 is yet another flowchart of the application phase according to an embodiment of the present disclosure.

On the other hand, further reference can be made to FIG. 9, which is yet another flowchart of the application phase according to an embodiment of the present disclosure. In this embodiment, the step of determining whether the button object has the characteristic object in the application phase further includes:

Step S90: performing a graphic identification process to identify another graphic object from the button object, and calculate the similarity between the at least one graphic object and the another graphic object. In this step, the graphic identification process can be the machine learning model trained in the aforementioned learning phase. The button object detected in step S31 is input into the trained machine learning model to determine whether the button object is classified into the button category created in the previous steps.

Step S91: determining whether the similarity is greater than a predetermined similarity.

In detail, an area of the graphic object can be further considered and weighted when calculating the similarity. For example, coordinates of the button object detected in step S31 can be taken into consideration. For example, by determining upper left and lower right coordinates of the graphic object in the memory, an area of the learned graphic object can be estimated. Further, when the graphic object is identified in step 90, upper left and lower right coordinates are determined to estimate an area of the graphic object in the current screen, then an area difference is considered, and the similarity can be calculated while weighting the area difference.

In response to the similarity being greater than the predetermined similarity, the application proceeds to step S92: determining that the button object has the characteristic object.

In response to determining the button object has the characteristic object, the application proceeds to step S33: perform an emphasis process on the button object in the current screen of the user interface.

Figure 10:
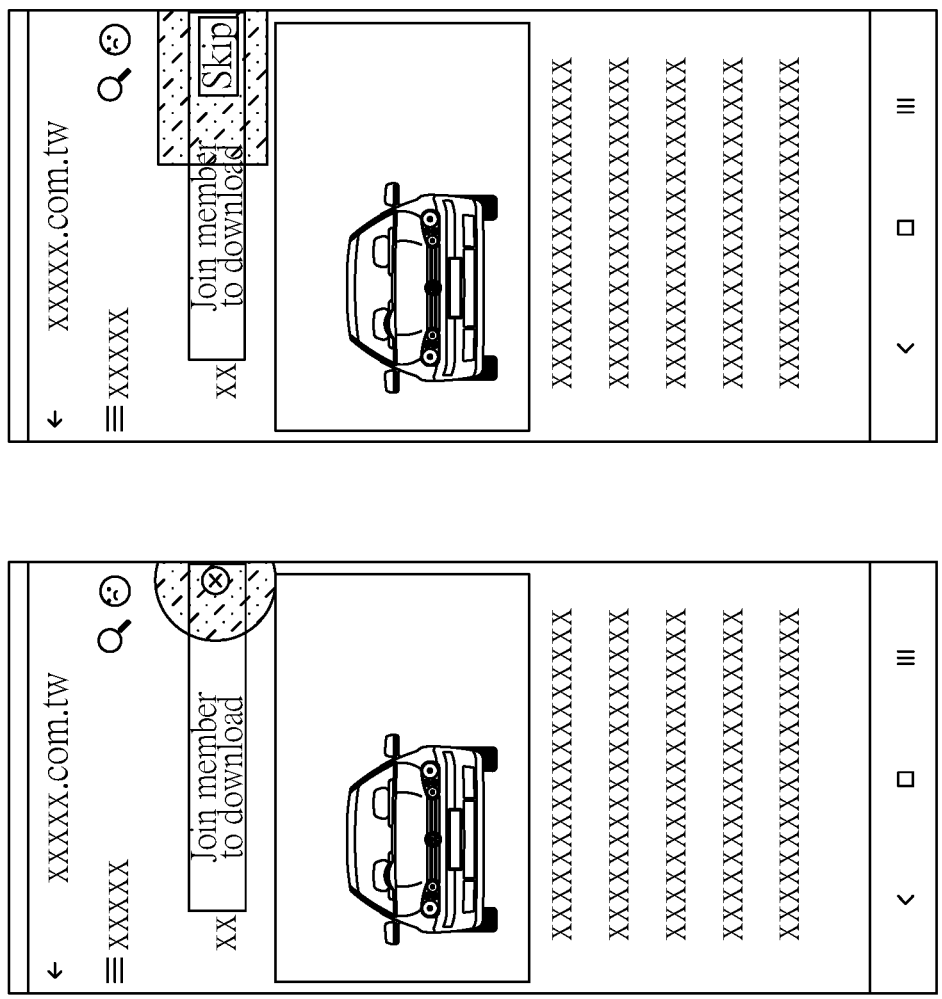
FIG. 10 shows multiple examples of an emphasis process according to an embodiment of the present disclosure.

Reference can be made to FIG. 10, which shows multiple examples of an emphasis process according to an embodiment of the present disclosure. As shown in FIG. 10, the emphasis process can include magnifying, flashing, coloring, or other eye-catching methods to mark the detected characteristic objects, and can also include increasing a sensing range of the closing option, as shown in a shaded part of FIG. 10. In a specific embodiment, the emphasis process can also be set to automatically click the closing option for the user. For example, the user input inp recorded in the learning phase (for example, input the corresponding key code and the corresponding input position) can be automatically applied to the closing option.

Reference is made to FIG. 3 again. The application phase can further include step S34: detecting whether the object string exists in the current screen by using the third identification process. The third identification process in this step can include executing the graphic identification process trained in step 28 (for example, the aforementioned YOLO V3 model) to determine whether the object string recorded in the previous learning phase exists in the current screen.

In response to the object string existing in the current screen, the application phase proceeds to step S35: perform an emphasis process on the object string in the current screen of the user interface.

In conclusion, the processing system and processing method for the user interface provided by the present disclosure can automatically find user interfaces representing specific meanings, such as closing and rejecting after a specific model is established through the learning phase, so as to perform the emphasis process to increase a sensing range or dynamically zoom, color, flash, and the like to prompt the user to close unnecessary advertisements or windows at the position that the emphasis process is performed, thereby reducing the chance of users touching the screen by mistake and wasting the users' time and energy.

In addition, for different types of buttons, such as a button object with a text object or a graphic object, the processing system and processing method for the user interface provided by the present disclosure can perform targeted learning for characteristics of the above objects, and can even learn about non-button type objects, which enhances freedom in system learning for the users.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A processing method for a user interface, comprising:
configuring a processor to enter a learning phase, including:
configuring the processor to capture a first screen of the user interface;
configuring the processor to detect whether there is a user input from an input module, wherein the user input corresponds to an input position on the user interface;
in response to detecting the user input, configuring the processor to capture a second screen of the user interface;
configuring the processor to compare a difference between the first screen and the second screen and store the difference in a memory;
configuring the processor to execute a first identification process to detect a closed frame as a button object from the difference according to the input position;
configuring the processor to execute a second identification process to identify a characteristic object from the button object; and
configuring the processor to associate the button object with the characteristic object and store the button object and the characteristic object in the memory; and
configuring the processor to enter an application phase, including:
configuring the processor to capture a current screen of the user interface, and use the first identification process to detect whether the button object exists in the current screen;
in response to detecting that the button object exists in the current screen, configuring the processor to execute the second identification process to determine whether the button object has the characteristic object; and
in response to determining the button object has the characteristic object, configuring the processor to perform an emphasis process on the button object in the current screen of the user interface.

2. The processing method according to claim 1, wherein the first identification process includes:
executing, according to the input position, a blob detection process to look outwards for the closed frame with the input position as a center;
adding, by using the closed frame as a reference, a setting margin to obtain a button frame; and
using a captured image corresponding to the button frame as the button object.

3. The processing method according to claim 1, wherein the second identification process includes:
performing a binarization pre-process on the button object obtained by the first identification process; and
performing a text identification process to identify a text object from the pre-processed button object as the characteristic object.

4. The processing method according to claim 3, wherein in the application phase, a step of determining whether the button object has the characteristic object further includes:
performing the binarization pre-process on the button object;
performing the text identification process to identify another text object from the pre-processed button object, calculating a similarity between the text object and the another text object, and determining whether the similarity is greater than a predetermined similarity; and
in response to the similarity being greater than the predetermined similarity, determining that the button object has the characteristic object.

5. The processing method according to claim 1, further comprising:
in response to not detecting the closed frame from the difference, configuring the processor to perform a third identification process to identify the characteristic object from the difference.

6. The processing method according to claim 5, wherein the third identification process includes performing a graphic identification process, the characteristic object includes a plurality of graphic objects, and the graphic identification process includes inputting the difference into a machine learning model to train the machine learning model to take out the plurality of graphic objects from the difference as an object string and storing the object string in the memory,
  wherein the application phase further includes:
    configuring the processor to detect whether the object string exists in the current screen by using the third identification process; and
    in response to detecting that the object string exists in the current screen, configuring the processor to perform the emphasis process on the object string in the current screen of the user interface.

7. The processing method according to claim 1, wherein the second identification process includes:
  performing a graphic identification process to identify at least one graphic object from the button object as the characteristic object.

8. The processing method according to claim 7, wherein in the application phase, a step of determining whether the button object has the characteristic object further includes:
  performing the graphic identification process to identify another graphic object from the button object, calculating a similarity between the at least one graphic object and the another graphic object, and determining whether the similarity is greater than a predetermined similarity; and
  in response to the similarity being greater than the predetermined similarity, determining that the button object has the characteristic object.

9. The processing method according to claim 7, the graphic identification process includes inputting the button object obtained by the first identification process into a machine learning model to train the machine learning model to classify the button object including the graphic object into a button graphic category.

10. The processing method according to claim 9, wherein in the application phase, the step of determining whether the button object has the characteristic object further includes:
  inputting the button object into the trained machine learning model;
  using the trained machine learning model to identify another graphic object from the button object, calculating a similarity between the at least one graphic object and the another graphic object, and determining whether the similarity is greater than a predetermined similarity; and
  in response to the similarity being greater than the predetermined similarity, determining that the button object has the characteristic object.

11. A processing system, comprising:
  a user interface;
  an input module;
  a memory; and
  a processor configured to enter a learning phase and an application phase,
  wherein in the learning phase, the processor is configured to:
    capture a first screen of the user interface;
    detect whether there is a user input from the input module, wherein the user input corresponds to an input position on the user interface;
    in response to detecting the user input, capture a second screen of the user interface;
    compare a difference between the first screen and the second screen and store the difference in the memory;
    execute a first identification process to detect a closed frame as a button object from the difference according to the input position;
    execute a second identification process to identify a characteristic object from the button object; and
    associate the button object with the characteristic object and store the button object and the characteristic object in the memory,
  wherein in the application phase, the processor is configured to:
    capture a current screen of the user interface, and use the first identification process to detect whether the button object exists in the current screen;
    in response to detecting that the button object exists in the current screen, execute the second identification process to determine whether the button object has the characteristic object; and
    in response to determining the button object has the characteristic object, perform an emphasis process on the button object in the current screen of the user interface.

12. The processing system according to claim 11, wherein the first identification process includes:
  executing, according to the input position, a blob detection process to look outwards for the closed frame with the input position as a center;
  adding, by using the closed frame as a reference, a setting margin to obtain a button frame; and
  using a captured image corresponding to the button frame as the button object.

13. The processing system according to claim 11, wherein the second identification process includes:
  performing a binarization pre-process on the button object obtained by the first identification process; and
  performing a text identification process to identify a text object from the pre-processed button object as the characteristic object.

14. The processing system according to claim 13, wherein in the application phase, a step of determining whether the button object has the characteristic object further includes:
  performing the binarization pre-process on the button object;
  performing the text identification process to identify another text object from the pre-processed button object, calculating a similarity between the text object and the another text object, and determining whether the similarity is greater than a predetermined similarity; and
  in response to the similarity being greater than the predetermined similarity, determining that the button object has the characteristic object.

15. The processing system according to claim 11, wherein in the learning phase, the processor is further configured to:
  in response to not detecting the closed frame from the difference, perform a third identification process to identify the characteristic object from the difference.

16. The processing system according to claim 15, wherein the third identification process includes performing a graphic identification process, and the characteristic object includes a plurality of graphic objects, and the graphic identification process includes inputting the difference into a machine learning model to train the machine learning model to serve the plurality of graphic objects at the difference as an object string and storing the object string in the memory,
  wherein, in the application stage, the processor is further configured to:

detect whether the object string exists in the current screen by using the third identification process; and in response to detecting that the object string exists in the current screen, perform the emphasis process on the object string in the current screen of the user interface.

17. The processing system according to claim 11, wherein the second identification process includes:

performing a graphic identification process to identify at least one graphic object from the button object as the characteristic object.

18. The processing system according to claim 17, wherein in the application phase, a step of determining whether the button object has the characteristic object further includes:

performing the graphic identification process to identify another graphic object from the button object, calculating a similarity between the at least one graphic object and the another graphic object, and determining whether the similarity is greater than a predetermined similarity; and in response to the similarity being greater than the predetermined similarity, determining that the button object has the characteristic object.

19. The processing system according to claim 17, the graphic identification process includes inputting the button object obtained by the first identification process into a machine learning model to train the machine learning model to classify the button object including the graphic object into a button graphic category.

20. The processing system according to claim 19, wherein in the application phase, a step of determining whether the button object has the characteristic object further includes:

inputting the button object into the trained machine learning model;

using the graphic recognition process to identify another graphic object from the button object, calculating a similarity between the at least one graphic object and the another graphic object, and determining whether the similarity is greater than a predetermined similarity; and in response to the similarity being greater than the predetermined similarity, determining that the button object has the characteristic object.

* * * * *